United States Patent [19]

Cameron

[11] Patent Number: 4,565,274

[45] Date of Patent: Jan. 21, 1986

[54] FRICTION CLUTCH ELEMENT

[75] Inventor: Mick G. Cameron, Auburn, Ind.

[73] Assignee: Dana Corporation, Toledo, Ohio

[21] Appl. No.: 480,324

[22] Filed: Mar. 30, 1983

[51] Int. Cl.$^4$ .............................................. F16D 69/00
[52] U.S. Cl. .............................. 192/107 R; 192/70.14; 188/218 XL
[58] Field of Search .......... 192/107 R, 107 M, 70.14, 192/107 C; 188/218 XL

[56] References Cited

U.S. PATENT DOCUMENTS

| | | | |
|---|---|---|---|
| 2,554,874 | 5/1951 | Oetzel | 192/107 R |
| 2,966,737 | 1/1961 | Spokes et al. | 192/107 M |
| 3,605,967 | 9/1971 | Warren et al. | 192/107 R |
| 3,696,902 | 10/1972 | Dantele | 192/107 C |
| 3,724,623 | 4/1973 | Thrower et al. | 192/107 R |

Primary Examiner—Rodney H. Bonck
Assistant Examiner—Richard M. Lorence
Attorney, Agent, or Firm—Frank B. McDonald

[57] ABSTRACT

A friction clutch element is disposed for mounting to a rotatable clutch disc. The element is designed to improve the uniformity in coefficient of friction values over a friction surface area thereof during clutch operation, particularly when such surface is formed of ceramic material. The element includes friction facings having symmetrically disposed radially inner and outer subportions integrally joined by a center subportion of a circumferentially shorter dimension. The facings contain radially disposed, continuously arcuate leading and trailing edges, and in a preferred embodiment, the leading and trailing edge portions of the outer and inner subportions are convex, while those of the center subportion are concave.

7 Claims, 3 Drawing Figures

FRICTION CLUTCH ELEMENT

BACKGROUND OF THE INVENTION

This invention relates to friction clutches of the type employed in drive lines of heavy duty vehicles. More particularly, the invention relates to friction facing elements employed in the driven discs of such friction clutches.

Traditional friction elements of the type bonded and/or riveted to clutch discs have been made primarily of organic fiber materials. Such materials have been satisfactory under normal conditions wherein the friction elements have had standard useful lives. However, in heavy duty environments, the organic friction elements have tended to wear out in considerably shorter periods of time and to thus require frequent replacement. This problem has become exacerbated in modern heavy duty vehicles wherein even greater loads have been imposed on such elements.

The latter has led to the development of friction elements which employ ceramic facings to provide greater durability. However, in the environment of friction clutches, ceramic materials have been found to be generally sensitive to heat, in that their coefficients of friction vary as a function of temperature. Thus, while the coefficient of friction of a ceramic element may have a value of 0.3 over a surface area thereon at a temperature of 350° F., the same element may on a separate localized area have a coefficient of friction of 0.5 at 600° F. Such disparity in coefficient of friction values over the surface of a friction element causes a chatter phenomenon, wherein the element may rapidly alternately grab and release an associated pressure plate during clutch engagement.

What is needed is a ceramic friction clutch element which is less sensitive to heat, and thus not subject to the aforedescribed chatter phenomenon.

SUMMARY OF THE INVENTION

The ceramic friction element of the present invention provides for improved heat transfer, and thus achieves a more uniform temperature distribution over its radially outer and radially inner surface areas than do conventionally designed ceramic friction elements. As a result, the element of the present invention provides greater uniformity in coefficient of friction over its surface. The element is disposed for mounting to a rotatable clutch driven disc, and includes radially symmetrical leading and trailing edges, each defining convex and concave portions.

In a preferred form, the friction element includes a pair of radially spaced subportions having both radial and circumferential symmetry. A radial centerline passes through the friction element between respective spaced radially inner and outer subportions. A pair of subportion centerlines are equally and radially spaced from the radial centerline. All of the centerlines define arcs coterminous with the radially extending leading and trailing edges of the element. The two subportion centerlines define two spaced arcs which extend between two lines extending radially outwardly from the axis of rotation of the driven disc to which the element is affixed. The latter subportion arcs each extend over a greater angle than the interjacent arc of the radial centerline.

DETAILED DESCRIPTION OF A PREFERRED EMBODIMENT

Figure 1:
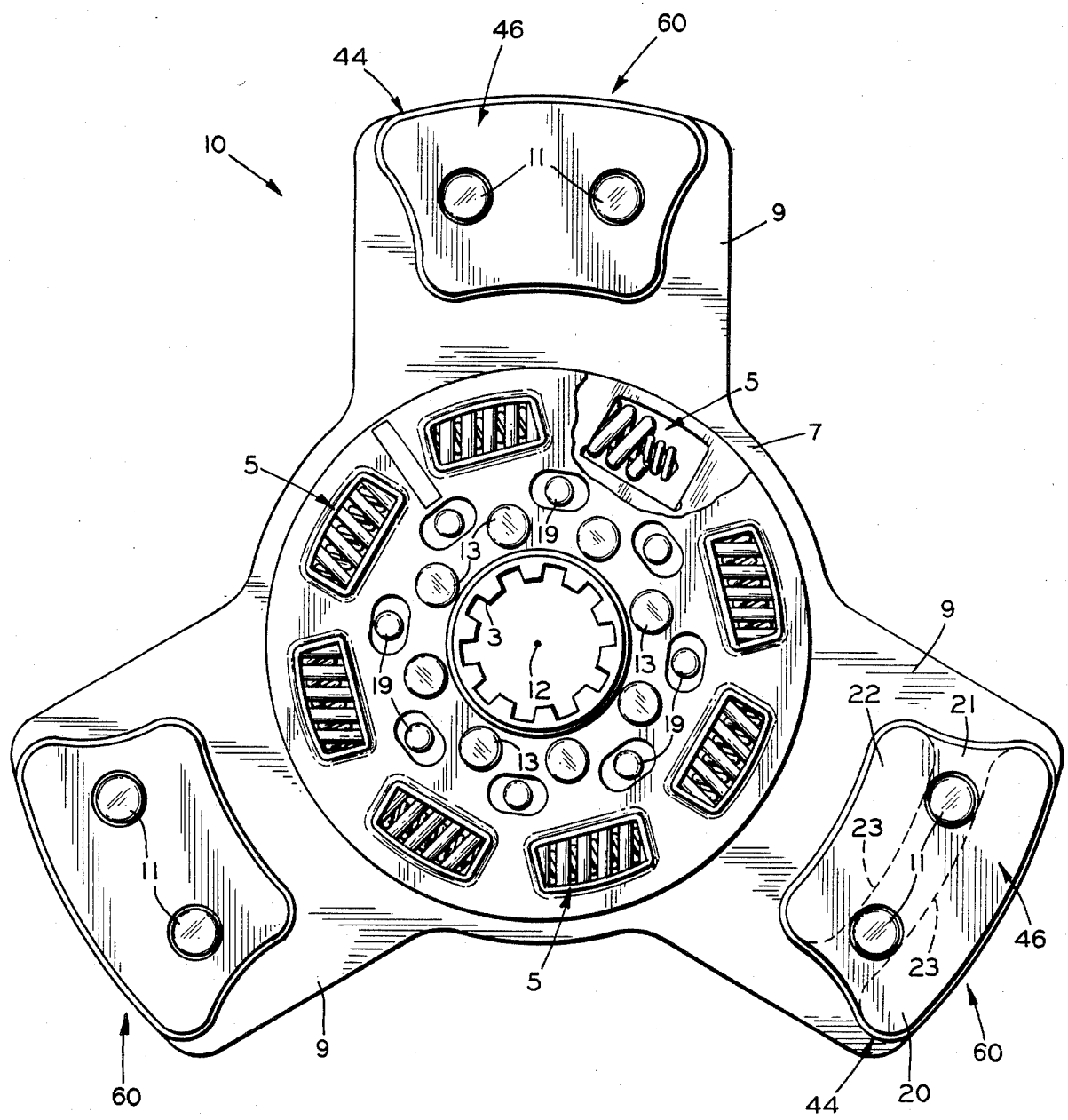
FIG. 1 is a face view of a driven clutch disc which contains a presently preferred embodiment of a friction clutch element.

Referring first to FIG. 1, a driven clutch disc 10 is shown positioned about an axis or center of rotation 12. The driven disc 10 includes an internally splined input portion 3 which is adapted for receiving an input shaft (not shown). A plurality of spring dampening members 5 are circumferentially positioned about the center of rotation for absorbing shock loads transmitted thereto through an output portion 7 of the driven disc 10. The output portion 7 includes radially extending arms or paddles 9, the latter carrying clutch friction elements 60 thereon. In the preferred embodiment as shown, the friction elements 60 are affixed by rivets 11, although securement of the elements 60 to the paddles 9 may be by other means, as bonding for example. A second set of rivets 13 hold the respective assembly of input, output, and spring dampening members together, while a third set of rivets 19 are employed to limit relative movement between input and output members about the axis of rotation 12, as will be appreciated by those skilled in this art.

Each friction element 60 includes a backing plate 44 to which is bonded a friction facing 46. Although in the preferred embodiment the backing plate 44 shares the same shape as the friction facing, the shared symmetry is for convenience only, and the backing plate may alternatively be manufactured to have a shape entirely distinct from that of the friction facing.

Figure 2:
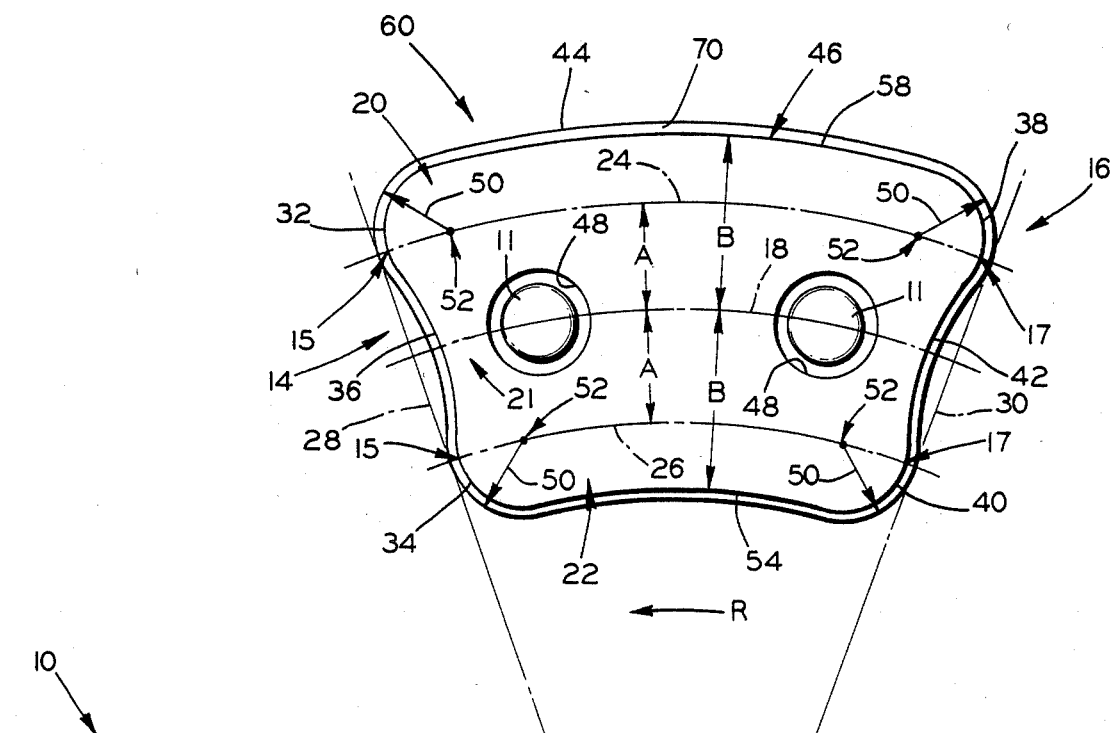
FIG. 2 is a face view of a preferred embodiment of a ceramic friction clutch element constructed in accordance with the present invention.

Referring now to FIG. 2, the clutch friction element 60 is more particularly shown. Each friction facing 46 thereof comprises an arcuate heat absorbing body, preferably of a ceramic composition. In order to minimize distortions or gradients in temperature across the radially extending surface thereof, the friction facing 46 is designed to provide greater heat carrying capacity on its radially inner and radially outer portions. These portions are thus circumferentially enlarged to assure that any hot spots will be relatively centered intermediately or radially within the body of the friction element, rather than along the radially inner and outer peripheral portions thereof. High heat concentrations in the latter areas cause the undesirable distortions in coefficient of friction earlier referred to, which result in chatter when ceramic facings are employed.

Each friction element 60 is disposed for rotation about the center of rotation 12 in a counterclockwise direction as indicated by the arrow "R". Under the designated rotation, the facing 46 of each element 60 has radially disposed leading and trailing edges 14 and 16, and includes a circumferentially extending radial centerline 18 through the radially symmetrical center of the element 60. Radially outwardly of the circumferential centerline 18 is a relatively "hot dog" shaped subportion 20, while radially inwardly of the centerline 18 is a slightly smaller but similarly shaped subportion 22; both are shown graphically in the right-hand paddle 9 of the disc 10 of FIG. 1. The respective subportions 20,22 have larger masses, and hence greater heat carrying capacities than the intermediate or center subportion 21 of the facing 46. The two subportions 20,22 are both radially and circumferentially symmetrical, and have centerlines 24 and 26 (FIG. 2), respectively, both of which parallel the interjacent radial centerline 18. The actual boundaries of the radially inner and outer subportions 20,22 relative to the center subportion 21 are depicted in FIG. 1 by dotted lines 23.

The radially disposed leading and trailing edges 14,16 are symmetrically oriented with respect to the axis of rotation 12 of the rotatable driven disc 10. Thus, a radial line 28 eminating from the axis of rotation 12 is tangent to the extremities 15 of the leading edge 14, while a radial line 30 eminating from the same center 12 is tangent to the extremities 17 of the trailing edge 16.

The radially outer subportion 20 contains a convex leading edge portion 32 which includes one of the aforesaid extremities 15. The extremity 15 is located at the intersection of the centerline 24 and the radial line 28. Similarly, the radially inner subportion 22 contains a convex leading edge portion 34 which has a second extremity 15 located at the intersection of the centerline 26 of the inner subportion 22 and the radial line 28. Intermediately of the convex leading edge portions 32 and 34 is a concave leading edge portion 36 symmetrically positioned about the interjacent centerline 18, but which is spaced from and hence does not lie upon the radial line 28.

At the radially disposed trailing edge 16 are radially outer and inner subportion convex trailing edge portions 38 and 40 which have the same attributes of the convex leading edges 32 and 34, wherein both are symmetrically tangent to a trailing edge radial line, in this case line 30. Likewise, a concave trailing edge portion 42 lies interjacent the latter convex trailing edge portions 38 and 40, the portion 42 being spaced from the tangent radial line 30.

Each friction facing 46 is preferably bonded to the backing plate 44. The plate 44 is preferably made of a steel or other conventional supporting material. The friction facing 46 in the preferred embodiment is of a sintered ceramic composition, although the concept of the present invention would not preclude the use of conventional organic friction materials. In the embodiment herein disclosed, however, a copper base ceramic having a composition of 70 to 80 percent copper is preferably employed, primarily for its attributes relating to manufacturing convenience, although other ceramic composition are not outside the scope of this invention. Such a sintered copper base facing material is commercially available under the trademark designations of S. K. Wellman TM 4380CB and Bendix ® 6043B.

Referring back to FIG. 2, it is readily apparent that the radially interjacent centerline 18 of the friction facing 46 extends circumferentially between the concave edge portions 36 and 42. The circumferential length of that portion of the centerline 18 extending between edges 36 and 42 defines an arc which is distinct from either of the arcs defined by the respective circumferential lengths of centerlines 24 and 26 extending between edges 32 and 38, and 34 and 40.

Specifically, the arcs defined by the subportion centerlines 24 and 26 extend over the same angle, preferably equal to forty (40) degrees in the embodiment of FIG. 2. By contrast, the interjacent arc defined by the centerline 18 of intermediate subportion 21 extends over a lesser angle, approximately thirty-five (35) degrees in the same embodiment. The result, that subportion 21 extends circumferentially over a smaller angle, insures that the intermediate or radially interjacent portion of the friction facing material will be relatively shorter, and hence subject to carrying a higher temperature than either of the radially inner and outer subportions, assuming a constant facing material thickness. In the preferred embodiment, rivet apertures 48 (FIG. 2) are symmetrically positioned along the radially interjacent centerline 18, further insuring less friction facing material in the subportion 21, and hence less heat carrying capacity in that region.

It will be apparent to those skilled in the art that subportion 22 will be subject to the same friction load and resultant heat energy as subportion 20, even though the length of the subportion arc 26 is shorter than that of subportion arc 24. This is due to the rotational speed of the mating pressure plate being relatively lower at subportion arc 26 than at subportion arc 24. The relative speed will obviously increase as the distance from the center of rotation 12 increases.

As earlier mentioned, the backing plate 44 and the friction facing 46 share a common symmetry, although the backing plate 44 is slightly larger than the friction facing 46. The preferred embodiment as shown provides a circumferentially extending border or overlap 70 of approximately one sixteenth of an inch. Alternatively, the overlap 70 of the backing plate 44 could be extended to an approximately three quarter inch overlap, and the rivets 11 could extend through the overlap portion of the backing plate 44, instead of the friction facing material per se. The latter embodiment is also intended to fall within the scope of the present invention.

In the preferred embodiment of the friction facing 46, each of the convex edges 32, 34, 38, and 40 thereof share a common dimension, each lying on a separate but equal radius 50 which eminates from a center of curvature, point 52, positioned on either of the subportion centerlines 24 or 26. In the preferred embodiment, the centerline 18 has a radial dimension from the center of rotation 12 of approximately five inches, but which may in some embodiments range from four to seven inches. For this range of radial dimension, a preferred radius 50 is one-half to five-eighths of an inch, while a preferred radius of the concave edge portions 36 and 42 is in the range of one and three quarters to two and one-half inches.

It will also be noted that in the preferred embodiment the leading and trailing edges 14 and 16 are curved along their entire extents to minimize the existence of portions perpendicular to a circumferential line of action relative to an engaging pressure plate, wherein such portions would be parallel to the radial lines 28 and 30, respectively. To the extent that each segment (with exception of points on the centerline 18) of the leading and trailing edges is arcuate and hence positioned at an acute angle to the line of action, the tendency for build-up of loose friction material along particular segments and resultant localized heat pockets are minimized. Such continuous curvature is thus highly desirable to avoid localized deterioration of friction facing edges.

It will be noted that the friction facings 46 of the preferred embodiment include preferred proportions of relative distances between subportion and interjacent centerlines, and radially innermost and outermost edges thereof. Thus, dimension "A" (center of FIG. 2) represents the distance between the interjacent centerline 18 and respective centerlines 24 and 26. The distance between the centerline 18 and the radially innermost edge 54 of the friction facing is represented by the dimension "B". Similarly, the distance between the centerline 18 and the radially outermost edge 58 is preferably equal to the same distance, and is also represented by the dimension "B". In the preferred embodiment, the ratio of "A" to "B" is 0.6. Thus, the radial distance "A" between one of the subportion centerlines 24, 26 and the interjacent centerline 18 is preferably 60% of the distance between the interjacent centerline 18 and the corresponding circumferentially extending extremity. The latter parameter has provided an optimal heat sink characteristic of the inner and outer subportions 22,20 relative to the intermediate or interjacent subportion 21, subject to the condition of having a constant friction facing thickness.

Figure 3:
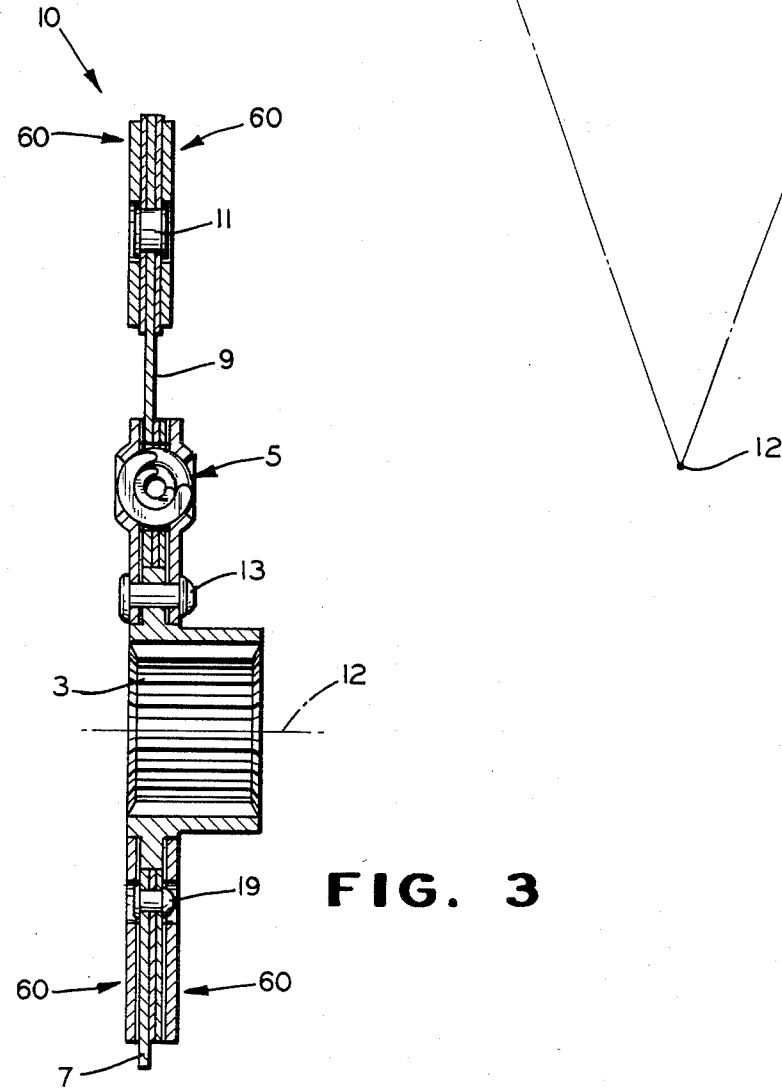
FIG. 3 is a side view of the clutch disc of FIG. 1.

Finally, referring to FIG. 3, it will be noted that in the preferred embodiment the elements 60 are installed in pairs. The rivets 11 are utilized to hold mated pairs of friction elements 60 together symmetrically on opposing sides of the disc 10, wherein one pair of elements is situated on each paddle 9. Also, from the foregoing description, it will be apparent to those skilled in the art that the leading and trailing edges 14 and 16 are interchangeable to the extent that this invention is predicated on symmetry. Thus, a reverse indication of the arrow "R" in FIG. 2 will result in a leading edge 16 and a trailing edge 14. Similarly, many other variations of the above-described invention will fall within the scope of the appended claims.

What is claimed is:

1. A fricition element disposed for mounting to a rotatable clutch disc having a center of rotation, said element comprising an arcuate friction facing having radially extending leading and trailing edges, said facing having a first circumferentialy extending centerline which defines an arc extending between said leading and trailing edges, said facing further having a radially outer and a radially inner subportion, each subportion radially spaced from said centerline, wherein said centerline is interjacently positioned with respect to said subportions, each subportion being both circumferentially and radially symmetrical and having second and third, respectively, circumferentially extending centerlines parallel to said interjacently positioned first centerline, said second the third centerlines of said respective subportions defining spaced arcs, each arc being coterminous with said radially extending edges of said facing at a point where two lines extending radially from said center of rotation intersect respective extremities of said subportions, said arcs defined by said second and third centerlines of said subportions extending over a greater angle than said arc defined by said interjacent first centerline, wherein said radially outer and inner subportions each have convex radially extending leading and trailing edge portions, each of said edge portions positioned symmetrically about said centerline of one of said subportions, said friction element further comprising concave radially extending leading and trailing edge portions positioned interjacent said respective convex edge portions, wherein said leading and trailing edges are continuously arcuate.

2. The friction element of claim 1 further comprising a backing plate, and said friction facing comprising a sintered ceramic material.

3. The friction element of claim 2 wherein said facing comprises a plurality of rivet apertures, said apertures symmetrically positioned along said interjacent, first centerline.

4. The friction element of claim 2 wherein each of said convex edge portions comprises a radius of at least one-half of an inch.

5. The friction element of claim 2 wherein the radial distance of one of said outer or inner subportion centerlines from said interjacent centerline is approximately 60% of the radial distance from said interjacent centerline to a circumferentially extending edge of said one subportion.

6. The friction element of claim 2 wherein said ceramic material comprises a copper base ceramic including cooper in the range of 70 to 80 percent.

7. A rotatable driven friction disc assembly comprising a pair of friction elements disposed on opposing sides thereof, each of said friction elements being disposed for mounting thereto, said disc having a center of rotation, each said element comprising an arcuate friction facing having radially extending leading and trailing edges, said facing having a first circumferentially extending centerline which defines an arc extending between said leading and trailing edges, said facing further having a radially outer and a radially inner subportion, each subportion radially spaced from said centerline, wherein said centerline is interjacently positioned with respect to said subportions, each subportion being both circumferentially and radially symmetrical and having second and third, respectively, circumerentially extending centerlines parallel to said interjacently positioned first centerline, said second and third centerlines of said respective subportions defining spaced arcs, each arc being coterminous with said radially extending edges of said facing at a point where two lines extending radially from said center of rotation intersect respective extremities of said subportions, said arc being defined by said second and third centerlines of said subportions extending over a greater angle than said arc defined by said interjacent first centerline, said radially outer and inner subportions of said friction facings including convex radially extending leading and trailing edge portions, each of said edge portions positioned symmeterically about said centerline of one of said subportions, said friction facings further comprising concave radially extending leading and trailing edge portions positioned interjacent said respective convex edge portions, wherein said leading and trailing edges are continuously arcuate.

* * * * *